United States Patent [19]

Holm et al.

[11] Patent Number: 4,767,585

[45] Date of Patent: Aug. 30, 1988

[54] PROCESS FOR PRODUCING MOLDED BODIES FROM GRANULAR MATERIAL OF SILICON, GERMANIUM OR MIXED CRYSTALS OF THESE ELEMENTS

[75] Inventors: Claus Holm, Stammham; Erhard Sirtl, Marktl; Josef Dietl, Neuötting; Franz Hölzlwimmer, Gumpersdorf, all of Fed. Rep. of Germany

[73] Assignee: Heliotronic GmbH, Burghausen, Fed. Rep. of Germany

[21] Appl. No.: 36,352

[22] Filed: Apr. 8, 1987

[30] Foreign Application Priority Data

Apr. 23, 1986 [DE] Fed. Rep. of Germany ....... 3613778

[51] Int. Cl.⁴ ...................... B29C 39/02; B29C 39/38
[52] U.S. Cl. .................................................. 264/82
[58] Field of Search ..................................... 264/65, 82

[56] References Cited

U.S. PATENT DOCUMENTS 3,868,435  2/1975  Daxer et al. ...................... 264/332

Primary Examiner—Ivars Cintins
Attorney, Agent, or Firm—Collard, Roe & Galgano

[57] ABSTRACT

A process for preparing molded bodies of granular material of silicon, germanium or mixed crystals of these elements. The granular material is introduced into a defined three dimensional mold and a chemical transport reaction is started which proceeds with the transport of silicon or germanium. As a result, the particles of the granular material intergrow with each other and eventually form a solid, porous molded body. By varying the starting material, the transport agent, and by adding dopants, the electrical properties of the product can be varied.

10 Claims, 1 Drawing Sheet

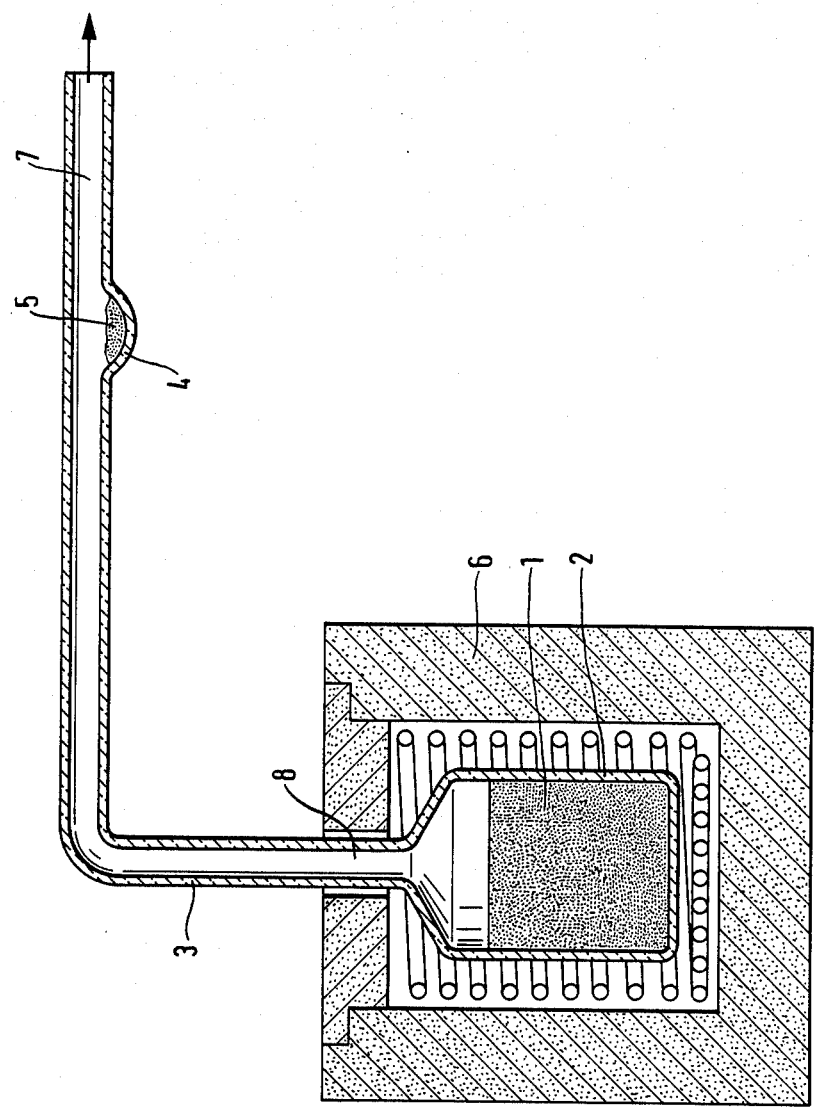

PROCESS FOR PRODUCING MOLDED BODIES FROM GRANULAR MATERIAL OF SILICON, GERMANIUM OR MIXED CRYSTALS OF THESE ELEMENTS

This invention relates to a process for producing molded bodies from granular material of silicon, germanium, or mixed crystals of these elements.

BACKGROUND OF THE INVENTION

When molded bodies are prepared from silicon or germanium granular material, the particles of the granular material are joined together by sintering, to produce a consolidated material, having the desired three-dimensional shape. Another method requires the particles of the granular material to be melted superficially, for example, by means of an electron beam, to join the contacting surfaces, so that they consolidate upon cooling down. In these processes where the granular material has to be heated to temperatures in the region of their melting point, the material may become contaminated from binders. According to a further known process, the granular silicon material is brought into contact with a silicon etching agent, wherein the particles of the granular material consolidate to form a molded body as a result of reaction bonding to each other. However, in this case, an oxide layer is formed on the individual particles, which makes the material inherently unsuitable for applications in which a low oxygen content is important.

In another known process, the particles of the granular material are mixed with carbonizable substances and after thermal treatment, are joined by the carbon to form a molded body. The resultant material is generally unsuitable for applications requiring high purity because of its carbon content. In many of the known processes, the use of fine granular material, i.e., of granular material with a mean particle size of less than 1 mm, is often difficult because of its handling problems.

SUMMARY OF THE INVENTION

It is therefore an object of the invention to provide a process for using fine particle granular materials wherein, under defined conditions, molded bodies can be produced which meet the highest purity requirements.

This invention utilizes a process wherein the granular material, selected for a particular example, is introduced into a three dimensional mold, and conditions are established in the mold for a chemical transport reaction, to transport the silicon or germanium. These conditions are maintained until adjacent particles of granular material intergrow with each other due to the transport reaction, and are consolidated into a molded body of the desired three dimensional shape.

In the process of the invention, granular material up to a grain size which just passes through a sieve with a wire mesh of 10 mm, can be used with good results. A particular advantage is, however, that even the fine-particle fractions which are difficult to handle can be used. These typically belong to fractions which just pass through sieves with a wire mesh between 1 and 0.03 mm.

In a prefered embodiment, granular material is selected whose bulk density corresponds to about 30 to 90% and, preferably 40 to 80%, of the density of the solid material. For example, in the case of silicon, the bulk density of the fine dust (grain size corresponding to a wire mesh of 0.1 to 0.3 mm) is typically about 1.1 to 1.5 g/cm$^3$, i.e., approximately 47 to 65% of the density of solid silicon. These bulk density ranges in most cases ensure that the arrangement of the particles of the granular material will be sufficiently dense so that the molded body will be mechanically durable.

In principle, it is possible to use even granular material with a relatively high impurity level having a silicon or germanium content of only 90 to 95% by weight, provided the impurities do not interfere with the transport reaction. However, since it has been found that transport reactions are very easily affected by the presence of impurities, a starting material is preferably used with a purity of at least 99% by weight, and preferably at least 99.9% by weight. As a rule, the choice of starting material is based on the purity required for the molded body. Thus, from granular silicon material with a purity of 99.9999% by weight, molded bodies can be produced which can be used as substrates in the deposition of ultra pure silicon, a process which requires the highest purity. It is also possible to use granular material with mixed crystals of silicon and germanium.

The three dimensional mold into which the selected granulate is introduced in a subsequent process step does not necessarily have to correspond to that of the desired molded body, since the final product can also be shaped by a subsequent forming such as turning, grinding, milling or sawing. The final product is shaped by loading the granular material into correspondingly shaped elements such as hollow molds in the form of tubes, cups, hollow cylinders, hollow blocks and the like. These shaped elements may then be introduced into a receiver for the transport reaction. Preferably, the shaped elements are also at least partially components of the receiver. They therefore provide both shape, and act as the reaction vessel at the same time.

Wall materials are preferably selected for the hollow molds which remain both dimensionally stable and inert during the reaction, while in contact with the particles of the granular particular, quartz glass, and graphite or oxide materials such as, for example, aluminum or magnesium oxide. Also, mullite or mixed oxides can be used in solid or fiber form. For example, substances based on aluminum and silicon oxide, carbides, such as, for example, silicon carbide, or nitrides, such as silicon nitride, can be used. In addition to its high chemical and thermal stability, quartz glass has the advantage that the granular material can be melted into the intended three dimensional shape such as a tube, round or polygonal bar, slab, sphere or cylinder, and thus is present in a defined form in a sealed container.

It is possible to increase the bulk density of the granulate loaded into the particular shaped element by compacting measures, such as, for example, vibration or ultrasonic treatment if the final product is required to be compact, or if the initial material is too loosely packed.

Before the actual transport reaction is started, the granular material can be freed of impurities, such as surface bound oxides, by baking it out. Surface bound oxides can easily form on the granular material stored in air, particularly for fine material with an extensive surface area (particle size generally below 1 mm), and may lead to problems during the transport reaction. Depending on the starting material, the bake out temperature depends upon the temperature at which the oxides start to become volatile. Thus, in the case of silicon, the bake out is performed in general at 1050° to 1400° C. (evaporation of silicon monoxide as a result of reaction of SiO$_2$ and elemental silicon), preferably 1100° to 1200° C. in vacuum, beneficially at 0.01 bar or less. The time duration is typically up to about 5 hours. Preferably, the conditions for the actual transport reaction are established immediately thereafter in order to avoid fresh contamination of the granular material.

The conditions under which the chemical gas phase transport of silicon or germanium can take place are known in principle, and can be found in technical literature (cf. H. Schäfer, Chemische Transportreaktionen (Chemical Transport Reactions), published by Verlag Chemie, Weinheim (1962)). These are usually systems in which the source and substrate are precisely defined. Surprisingly, it has been found that suitable transport conditions can also be maintained within granular material beds, even over a significant length range, although it is no longer possible to precisely define the source and substrate in this connection. It has also been possible to produce round rods with a diameter of approximately 3 cm and a length of approximately 30 cm.

Generally, substances suitable as transport agents take up the substance to be transported to form a volatile compound, and later release it at another point while not producing any impermissible contamination. Such substances are available, for example, in the form of hydrogen, the halogens, the chalkogens, or else compounds, such as, for example, halides of the third, fifth or sixth main group of the periodic system, for example BI$_3$, PI$_3$ or TeCl$_4$. There are special advantages when especially in cases where the system containing the granular material is closed such as, a sealed quartz vessel, transport agents are selected which can be introduced in solid form into the transport space, as e.g., iodine, with or without dopants, and especially tellurium. The use of substances which release transport agent under the reaction conditions, such as, for example, SiCl$_4$, is also possible.

In accordance with a further development of the inventive idea, the granular material is present in an open reaction space, such as in a tube open at both ends. A carrier gas, such as argon or hydrogen, is loaded with the intended transport agent, for example, gaseous iodine, tellurium or hydrogen halide or hydrogen chalkogenide, and passed through the reaction space.

While the halogens do not act as dopants during the transport reaction, they can therefore be used advantageously in those cases in which an undoped product or a product having the tellurium or boron triiodide, or iodine with elemental boron a change in doping type of the starting material. The concentration of the dopant is, as a rule, 10$^{15}$ to 10$^{18}$ atoms/cm$^3$ of the particular semiconductor material.

While a temperature gradient is indispensable in the known methods of gas-phase transport in which a substrate or source are precisely defined, it has unexpectedly been found that, in the case of a volume filled with granular material, transport reactions can proceed even under isothermal conditions. This can possibly be explained by the fact that due to surface effects (points, edges) between the particles or the granular material, there are differences in chemical potential which start and continue the transport reaction even if a temperature gradient is absent (or can no longer be detected). In general, however, a temperature gradient of 5° C./cm maximum, advantageously up to approximately 1° C./cm, and preferably as linear as possible, will be established inside the transport In the interest of establishing the transport direction, and with a view to shorter reaction times, it has been found by experience that the course of the reaction is more uniform, and a more precise linear temperature gradient can be maintained. In principle, even greater gradients are possible. However, it becomes more difficult to maintain a controlled course of reaction particularly over fairly long distances. The direction of the temperature gradient is established in accordance with the desired transport direction and according to the reaction of the selected transport agent (from hot to cold or vice verse).

The choice of the absolute temperature range, within which the relative temperature range or temperature gradient is established for a particular example and is to be maintained precisely, is, on the other hand, subject to less strict conditions. The upper limit is set just below the melting point of the granular material used for a particular example, and the lower limit is about two-thirds of the value of the melting point measured in °C. In most cases, a temperature of about 1250° C. will not be exceeded for equipment design reasons. Preferably, the optimum temperature within the above limits is determined by preliminary experimentation.

To produce the required temperatures, heating sources are selected which precisely establish a temperature, which increases, decreases or is held constant in the required section where the transport reaction is carried out. Commercial gradient furnaces, such as resistance heated tubular furnaces, are suitable, with lengths up to 200 cm, and with a multiplicity of heating zones located in series. The zones have to be regulated separately, and be capable of precise adjustment. Other less expensive resistance heated furnaces are also suitable, provided they have a suitable temperature profile. Their temperature profiles can be easily determined using thermocouples, for example, based on platinum/platinum-rhodium. Frequently, the zones of constant, linear, or approximately linearly decreasing or rising temperature in the hot zone of a furnace can be extended by introducing metal blocks having a suitable cavity for receiving the reaction vessel filled with the granular material.

In the gas space, a transport agent pressure of typically 0.001 to 10 bar is preferable. Experience has shown that, for example, in the case of tellurium, even pressures in the range from 0.001 to 0.5 are adequate, while iodine usually requires higher pressures of about 0.1 to 10 bar. In the case of closed systems, the quantity of transport agent required to establish a certain pressure can be calculated approximately using the ideal gas law from the volume of granular material taken, the gas space, and the temperature. This initial pressure naturally changes during the transport reaction, for example, as a result of compound formation or condensation phenomena. In many cases, however, this change can be ignored. In open systems in which, for example, a carrier gas loaded with the transport agent flows through the granular material in the desired three dimensional mold, the selected flow rate and the pressure can be established and monitored by means of flow measuring instruments, such as rotameter, and by a controlled injection of the transport agent into the gas stream, for example, by means of an evaporator.

The time period during which the conditions allow a transport reaction to proceed is affected by many factors. For example, the time period is affected by the transport rate, which can be determined by the system selected in a particular case, the size, or the porosity of the product required. The reaction empirically on the basis of preliminary experiments. In many cases, values of about 2 to 50 hours have proved adequate. These values should not, however, be viewed as a restriction, but only as guide values.

DETAILED DESCRIPTION OF THE INVENTION

The following procedure for producing molded bodies in accordance with the invention is described with respect to the attached figure which shows a reaction vessel for making the molded devices.

First, the granular material, selected to meet suitable material parameters, is loaded into a reaction vessel to form the intended three dimensional shape. If, for example, a closed system is to be used, a quartz tube sealed at one end (ampoule) is employed wherein a quartz disc is inserted to cover the round section so that a flat end face is formed. After the granulate is filled and possibly compacted, the three dimensional shape of the granulate can be stabilized by applying a further quartz disc. If the process is to be continued without heating the system, the required quantity of transport agent, with or without a dopant, can be added at this time. This quantity can be determined to a good approximation using the ideal gas law, knowing the volume of the gas space, resulting from the difference between the total volume of the reaction space present after sealing, the volume of the granular material introduced, the intended temperature, and the intended pressure.

Referring to the figure, there is shown an arrangement suitable for a process in a closed system in which the granular material is freed of impurities, by baking out the oxides before the actual transport process. A quartz-glass ampoule 2 is filled with granular material 1. The granular material fill may be covered at its front and rear ends with quartz discs (not shown). One end of the ampoule terminates in a feed line 3, which has a recess or bulge 4, capable of receiving the intended quantity of transport agent 5, with or without a dopant. Bulge 4 can also be formed to so that transport agent 5 can be cooled externally, for example, by immersing the bulge in a freezing mixture while the granular material is baked out in the ampoule.

During the baking out, a vacuum is applied to feed line 3, and ampoule 2 is introduced into a tubular furnace 6, with the transport agent being cooled. The ampoule is kept in the furnace for the intended period of time at the desired temperature. Feed line 3 is then closed at zone 7 by a valve, or by sealing. Transport agent 5 can now be introduced from bulge 4 into the transport space inside of the ampoule by shaking. The reaction space can then be sealed by sealing zone 8.

The reaction vessel prepared in this manner, which determines the transport volume available in total, and also the three dimensional shape of the granular material, is now placed at a predetermined position in the selected heating device. This heating device guarantees the required temperature pattern, when serving as a tubular furnace. At the same time, the latter may desired final temperature from a lower temperature.

When this temperature range is entered, the desired partial pressure of the transport agent gradually builds up in the transport volume and transport reactions begin between the individual particles of the granular material. As a result of this material transport, wherein individual particles may act as substrate and source, the particles of the granular material begin to intergrow with each other and gradually consolidate into a porous, rigidly shaped body.

After the reaction time necessary to achieve the desired stability which is determined, for example, by preliminary experiments, the reaction vessel is allowed to cool, for example, by removing it from the heated zone, and the transport reaction is terminated. The vessel is then opened, and the molded body is removed.

A similar procedure can also be performed in an open system, after taking into account the temperature conditions and the elapsed time. A suitable reaction vessel can be constructed, for example, similar to the ampoule shown in the figure, except that in the region of the base surface, the reaction space merges into a discharge line constructed similar to feed line 3. In this case it is not absolutely necessary to provide recesses for the transport agent. During the bake out, an inert gas stream can then be passed through the granular material in order to remove the impurities. This gas stream can then be used to introduce the selected transport agent into the space occupied by the granular material for the transport reaction.

The material produced by the process of the invention has many types of application and further processing possibilities. Apart from mechanical shaping treatments by turning, grinding and sawing, the surface can be coated using a liquid material, such as, silicon or germanium. Coating can also be performed by gas-phase deposition of silicon, carbon or the like, or by reaction, such as by nitriding.

Because of the many doping possibilities, the electrical properties of the material can also be affected in a systematic manner. For example, if tellurium is used which acts both as a dopant and as a transport agent, a silicon material can be produced which is conductive at room temperature. Thin bars manufactured from such a material may, for example, be used as carrier bodies in the deposition of silicon, by decomposition of trichlorosilane. Because of the conductivity of the material at room temperature, it is possible to dispense with the additional heating usually necessary for thin bars of ultra pure silicon, to reach the temperature for an adequate current flow. Obviously, the material can also be used as a substrate in the deposition of silicon in another form, for example, as a slab or tube. Because of the extremely high purity of the substrate material, the entire molded body can usually be used further without having to separate the original substrate.

In addition, material which has been produced by the novel process and which is conductive at room temperature, can also be used for producing heating rods for resistance type heating devices. These heating rods are particularly useful for furnaces producing electronic components at high temperatures where the commonly used metallic heating rods are a constant source of impurities.

The material produced by the process of the invention can also be used as an oxygen getter medium since it combines the advantage of its high thermal resistance with its large available surface compared with the usual materials. This material can also be regenerated at temperatures above approximately 1000° C. since the silicon dioxide formed is removed as volatile silicon monoxide. The novel process therefore provides a material with a wide variety of uses from easily available starting materials. The production process is explained in exemplary manner in more detail by means of the following examples.

EXAMPLE 1

The enlarged part of the vessel (diameter approximately 8 cm), used as the reaction space of a quartz ampoule, constructed as in the figure and closed at one end, was filled with approximately 450 g. of granular silicon material (undoped, mean particle size approximately 100 to 200 μm) to a height of about 9 cm. Then, a quantity of iodine necessary to establish a working pressure of approximately 3 bar was introduced into a quartz tube, attached perpendicular to the feed line as a recess, so that it could be cooled externally.

While the iodine supply was cooled with liquid nitrogen, the enlarged part of the vessel containing the silicon was heated to 1200° C. and, at the same time, a vacuum of approximately $10^{-5}$ mbar was applied. These conditions were maintained for approximately 5 hours in order to remove any oxide present on the particles of the granular material.

The feed line to the vacuum pump was then sealed off immediately behind the iodine supply and the system closed. After cooling to room temperature, the iodine was sublimed into finally sealed off immediately behind its point of attachment to the transport space.

The closed reaction vessel, prepared in this manner, was then brought to a temperature of 1130° C. which, within the scope of the measurement accuracy, was constant over the entire volume, and wherein the quantity of iodine introduced could be expected, according to the ideal gas law, to produce an iodine pressure of approximately 3 bar in the system. Under these conditions, transport reactions began to proceed between the individual particles of the granular material, which gradually led to a consolidation and to an intergrowth of the entire material. After 5 days, the reaction was terminated.

The quartz ampoule was sawed open and the rigid silicon cylinder was removed.

EXAMPLE 2

Following the procedure described in Example 1, a quartz ampoule constructed in accordance with the figure was filled with 450 g of granular silicon material (undoped, tellurium content below the level of detection, mean particle size 100 to 200 μm). As a transport agent, tellurium was used in a quantity which ensured a pressure of 0.05 bar at a temperature of 1100° C. in the reaction space. A bulge was provided in the feed pipe to the vacuum pump for receiving the tellurium. It was not necessary to cool the tellurium while the granular silicon material was baked out.

After the system was sealed off for the first time (immediately behind the tellurium supply), the tellurium was shaken into the reaction space and the latter was then sealed off as described in Example 1.

The ampoule prepared in this manner was then introduced into a resistance heated furnace whose temperature was set to a temperature of 1100° C. and held constant within the scope of the measurement accuracy over the entire length of the ampoule (approximately 12 cm). According to the ideal gas law, a tellurium pressure of approximately 0.05 bar was calculated for the reaction space.

The reaction vessel was left for approximately 24 hours under these conditions. Then, the rigid cylindrical silicon molded body (tellurium content approximately 6 ppma) was removed. The material obtained exhibited electrical conductivity even at room temperature.

EXAMPLE 3

An ampoule filled with silicon was prepared in the manner described in Example 2. However, the amount of tellurium taken was reduced so that a pressure of 0.025 bar was calculated for the reaction space at a mean temperature of 1100° C.

The reaction vessel was then brought to a mean temperature of 1100° C. A temperature gradient of approximately 1° C./cm was established in the direction of the base over its entire length, and left for approximately 50 hours under these conditions.

A rigid cylinder was produced containing particles of granular silicon material which had intergrown with each other.

EXAMPLE 4

An ampoule charged with silicon was prepared in the manner described in Example 3 with the difference that, during the 5 hour vacuum treatment, the reaction vessel was not heated to 1200° C. but was kept at room temperature. In other respects, precisely the procedure described in Example 3 was adhered to.

A cylinder was obtained consisting of particles of granular silicon material which had intergrown with each other, but its mechanical rigidity was less than that obtained according to Examples 2 and 3.

EXAMPLE 5

Following the procedure described in Example 2, a quartz ampoule (volume of the reaction space approximately 65 cm³) constructed according to the figure, was filled with 40 g of granular germanium material (undoped, tellurium content below the level of detection, mean particle size approximately 100 to 200 μm). To receive the tellurium provided as transport material, a bulge was provided in the feed line to the vacuum pump and loaded with a quantity of tellurium which ensured a working pressure of approximately 0.1 bar in the reaction space at a temperature of approximately 900° C.

First, the system was connected to a vacuum pump and baked out for approximately 5 hours at approximately 900° C. and under a vacuum of approximately $10^{-5}$ mbar. The feed line to the vacuum pump was then sealed off immediately behind the tellurium supply, and the tellurium was shaken into the reaction space. Then, the feed line was again sealed off just behind its point of attachment to the reaction space.

The reaction vessel prepared in this manner was then introduced into a resistance heated furnace and maintained in a constant temperature zone kept at approximately 900° C., within the scope of the measurement accuracy over its entire length. Under these conditions, a tellurium pressure of approximately 0.1 bar was calculated according to the ideal gas law, in the reaction space.

After approximately 50 hours, the ampoule was removed and opened. A rigid porous cylinder was produced consisting of germanium particles which had intergrown with each other.

While only a few examples of the invention have been shown and described, it will be obvious that many modifications may be made thereto without departing from the spirit and scope of the invention.

What is claimed is:

1. A process for producing molded bodies of granular material of silicon, germanium, or mixed crystals of said elements, comprising the steps of:
   filling a three dimensional mold with the granular material selected from the group consisting of silicon, germanium, and mixed crystals thereof;
   establishing in the said filled mold a chemical gas phase transport reaction transporting silicon or germanium between the particles of the granular material disposed in said mold; and
   maintaining these conditions until adjacent particles of granular material are bonded to each other and consolidated into a molded body within the three dimensional mold.

2. The process as claimed in claim 1, wherein prior to said step of establishing the chemical gas phase transport reaction, additionally comprising the step of freeing the impurities bound to the surface of said granular material.

3. The process as claimed in claim 1, wherein after said step of filling, additionally comprising the step of establishing a temperature gradient of up to 1° C./cm along the three dimensional mold filled by the granular material.

4. The process as claimed in claim 1, wherein after said steps of filling, additionally comprising the step of establishing a constant temperature along the three dimensional mold filled by the granular material.

5. The process as claimed in claim 1, wherein a solid is used as the substance effecting the transport reaction.

6. The process as claimed in claim 1, wherein the transport reaction is performed in a quartz glass vessel.

7. The process as claimed in claim 1, wherein said establishing step is carried out at a temperature range having an upper limit just below the melting point of said granular material.

8. The process as claimed in claim 7, wherein the lower limit of said temperature range is two-thirds the value of the melting point of said granular material.

9. The process as claimed in claim 7, wherein said granular material is silicon and wherein said upper limit is 1,250° C.

10. A process for producing molded bodies of granular material of silicon, germanium, or mixed crystals of said elements, comprising the steps of:
    filling a three dimensional mold with the granular material selected from the group consisting of silicon, germanium, and mixed crystals thereof;
    establishing in the said filled mold a chemical gas phase transport reaction transporting silicon or germanium between the particles of the granular material disposed in said mold;
    maintaining these conditions until adjacent particles of granular material are bonded to each other and consolidated into a molded body within the three dimensional mold; and
    effecting the gas phase transport reaction by use of a solid substance selected from the group consisting of tellurium and iodine.

* * * * *